United States Patent [19]
Deane

[11] Patent Number: 5,796,873
[45] Date of Patent: Aug. 18, 1998

[54] IMAGE ENHANCEMENT

[75] Inventor: Jacqueline Margaret Deane, Essex, England

[73] Assignee: Fujifilm Electronic Imaging Ltd., London, England

[21] Appl. No.: 758,149

[22] Filed: Sep. 12, 1991

[30] Foreign Application Priority Data

Sep. 14, 1990 [GB] United Kingdom ............... 9020079

[51] Int. Cl.$^6$ ............................................. G06K 9/40
[52] U.S. Cl. ........................ 382/254; 382/167; 358/532
[58] Field of Search ........................... 382/54, 17, 27, 382/50, 51, 52, 56, 32; 358/79, 80, 464, 465, 466, 448, 458; 364/724.05, 724.06

[56] References Cited

U.S. PATENT DOCUMENTS

| | | | |
|---|---|---|---|
| 4,500,919 | 2/1985 | Schreiber | 358/78 |
| 4,638,369 | 1/1987 | Hsieh | 358/283 |
| 4,724,477 | 2/1988 | Ellis et al. | 358/80 |
| 4,845,550 | 7/1989 | Urabe et al. | 358/80 |
| 4,972,256 | 11/1990 | Hirosawa et al. | 358/532 |
| 5,050,223 | 9/1991 | Sumi | 382/54 |
| 5,134,667 | 7/1992 | Suzuki | 382/22 |

FOREIGN PATENT DOCUMENTS

| | | |
|---|---|---|
| 0098319 | 1/1984 | European Pat. Off. . |
| 0171954 | 2/1986 | European Pat. Off. . |
| 0185498 | 6/1986 | European Pat. Off. . |
| 0216536 | 4/1987 | European Pat. Off. . |
| 765446 | 1/1957 | United Kingdom . |
| 2050106 | 12/1980 | United Kingdom . |

OTHER PUBLICATIONS

Gonzalez, *Digital Image Processing*, Addison–Wesley, 1992. pp. 194–197.

*Primary Examiner*—Christoper S. Kelley
*Attorney, Agent, or Firm*—Sughrue, Mion, Zinn, Macpeak & Seas, PLLC

[57] ABSTRACT

A method and apparatus for enhancing an image defined by electrical signals representing the colour component content of each pixel of a relatively high resolution version of the image. The apparatus comprises a first store for storing the high resolution version of the image; a second store for storing fringe values; and a processor coupled with the first and second stores. The processor is adapted to determine for each colour component of each pixel in the first store a fringe value by determining the difference between the component values at the high resolution and at a lower resolution and to store the fringe values in the second store; to determine for each pixel the length of a vector whose components are defined by values related to the fringe values of that pixel; and to modify each original colour component value in the first store by an amount related to the respective fringe value determined in accordance with the relationship of the vector length with a threshold.

6 Claims, 2 Drawing Sheets

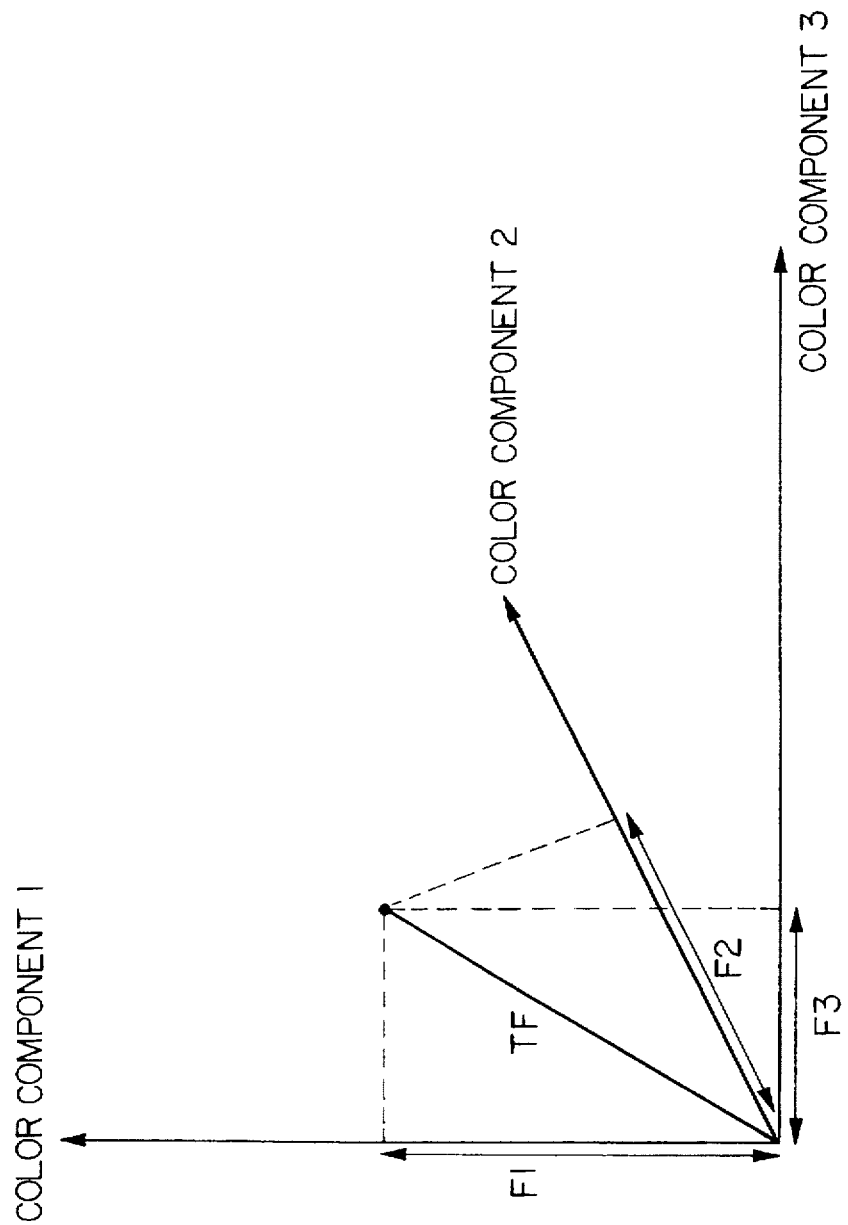

IMAGE ENHANCEMENT

FIELD OF THE INVENTION

The invention relates to methods and apparatus for enhancing an image.

DESCRIPTION OF THE PRIOR ART

In conventional image processing it is common practice to enhance the sharpness of an image by using a technique known as unsharp masking (USM). This technique involves the generation of a fringe signal by determining the difference between the image and a low pass filtered version of the image and then adding the resultant fringe signal, possibly after further processing such as gain correction, back into the original signal. Examples of known USM techniques are described in GB-A-765446, GB-A-2050106, and EP-A-0171954.

U.S. Pat. No. 4,536,803 (equivalent to EP-A-0098319) describes an unsharp masking process in which an image signal and two unsharp (low resolution) signals are generated, each unsharp signal being combined separately with a corresponding image signal to give two differential signals. The differential signals are mixed according to a selected mixing ratio to generate a resultant mixed signal which is then split into positive and negative correction components which are compared to positive and negative thresholds and adjusted accordingly. These adjusted signals are then combined to form a correction signal which is superimposed on the original image signal to enhance the image contrast. In this process the colour separations are handled individually.

In typical USM techniques, the gain by which each fringe value is multiplied (corrected) is reduced if the fringe value falls below a threshold. This threshold is used to reduce the noise introduced in the USM process by sharpening less, not at all, or even smoothing in areas where the fringe signal is calculated to be small. The problem with this is that although the noise in the final image can be reduced using this thresholding technique, the technique also severely reduces the sharpness of the final result since some image detail will also fall below the threshold.

EP-A-0185498 describes an enhancement procedure in which one separation is sharpened dependent on the unsharp image formed from that separation and the other separations but without thresholding.

SUMMARY OF THE INVENTION

In accordance with one aspect of the present invention, a method of enhancing an image defined by electrical signals representing the colour component content of each pixel of a relatively high resolution version of the image comprises for each colour component of each pixel obtaining a fringe value by determining the difference between the component values at the high resolution and at a lower resolution; determining for each pixel the length of a vector whose components are defined by values related to the fringe values of that pixel; and modifying each original colour component value or a value derived from each original colour component value by an amount related to the respective fringe value in accordance with the relationship of the vector length with a threshold.

In accordance with a second aspect of the present invention, apparatus for enhancing an image defined by electrical signals representing the colour component content of each pixel of a relatively high resolution version of the image comprises a first store for storing the high resolution version of the image; and processing means coupled with the first store, the processing means being adapted to determine for each colour component of each pixel in the first store a fringe value by determining the difference between the component values at the high resolution and at a lower resolution; to determine for each pixel the length of a vector whose components are defined by values related to the fringe values of that pixel; and to modify each original colour component value or a value derived from each original colour component value in the first store by an amount related to the respective fringe value determined in accordance with the relationship of the vector length with a threshold.

We have devised a new approach to the use of thresholding which produces a greater distinction between the image detail and the noise in the fringe by using the information in all colour components or separations when thresholding. The fringes of the colour components are considered to form a vector in N dimensional space where N is the number of colour components, the direction of this vector defining the colour change which is occuring. The length of the vector defines the magnitude of the colour change.

This adaptive thresholding, based on the length of the vector, has not been previously suggested and will retain detail not only in the colour component or separation in which it is most dominant but also in the other colour components, whereas in the conventional methods the detail may well fall below the threshold in all but the most dominant separation. Furthermore, it should be noted that the enhancement is dependent on the high and low resolution (sharp and unsharp) versions of all the colour components (separations) in contrast to prevous techniques.

The components of the vector may comprise the fringe values but preferably the components comprise the fringe values after multiplication by respective weights. In general, different weights or gains will be associated with each colour component and should usually be included at this stage when defining the vector components since otherwise a particularly noisy colour component separation will introduce noise into the length of the vector.

In one example, the length of the vector is compared with the threshold and if the length is less than the threshold then one process (e.g. a smoothing parameter) is applied when adding the fringe value to the original image pixel value, while if the length of the vector exceeds the threshold another process (eg. a sharpening parameter) is applied when adding the fringe signal back to the orignal image pixel signal or an image derived from processing the original image.

In general, however, it is not desirable merely to apply a different gain value depending upon whether or not the threshold is exceeded since this will usually result in a sudden increase in the fringe as the threshold is crossed giving a broken look to the sharpened edges in regions where the fringes lie close to the threshold.

Preferably therefore the modifying step comprises determining the resultant pixel value S' for a particular colour component in accordance with the following algorithm when the vector length exceeds the threshold;

$$S'=F1\times[(1-TH/TF)\times SH1^2+(TH/TF)\times SM1^2]^{1/2}+O$$

where:

O is the original image pixel value or a value derived from the image pixel value for that colour component, F1 is the fringe value for that pixel and colour component after multiplication by the factor specified by the colour gain for that colour component, TF is the square of the total length of the fringe vector, SH1 is the gain specified by a sharpening parameter, SM1 is the gain specified by a smoothing parameter, and TH is the threshold.

Preferably, the apparatus futher comprises a second store for storing the fringe values. The first and second stores may be formed by separate storage elements or different portions of a single memory.

Typically, the processing means will comprise a suitably programmed computer.

The invention is primarily concerned with the processing of digitally represented images but could also be applied to images represented by analog signals.

BRIEF DESCRIPTION OF THE DRAWINGS

An example of a method and apparatus according to the present invention will now be described with reference to the accompanying drawings, in which:

FIG. 3 depicts the vector whose components are defined by values related to the fringe values of a pixel.

DETAILED DESCRIPTION OF AN EMBODIMENT

Figure 1:
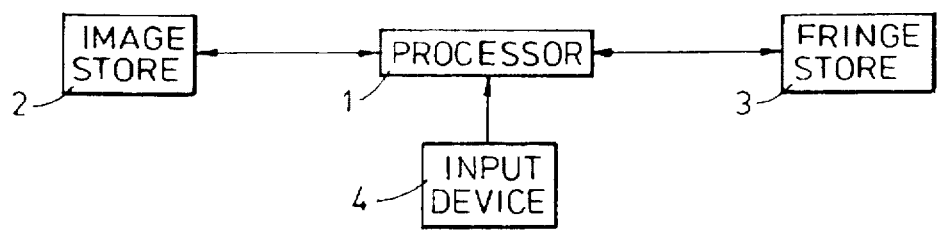
FIG. 1 is a block diagram of the apparatus.

The apparatus shown in FIG. 1 comprises a processor such as a microcomputer 1 connected to an image store 2, a fringe store 3, and an input device 4 such as a digitizing table or keypad.

An original image is stored in the image store 2 in the form of digital data defining the colour component content of each pixel of the image at a relatively high resolution. This data may have been generated electronically or, more usually, by scanning an original transparency using, for example, the Crosfield MAGNASCAN Input Scanner. Typically, an image is represented by three or four colour components or separations: cyan, magenta, yellow, and optionally black. In one example each colour component is defined by eight bit binary data so that each pixel is defined by 24 or 32 bits.

The input scanning process can smooth or degrade the original image and it is the intention of the present invention to enhance the image stored in the store 2. Broadly, this is achieved by obtaining a fringe signal for each colour component of each pixel which is then added back to the original pixel colour component value after further processing. The corrected fringe signal is obtained so as to enhance edges and other high frequency components within the original image but at the same time to reduce the effects of noise.

Figure 2:
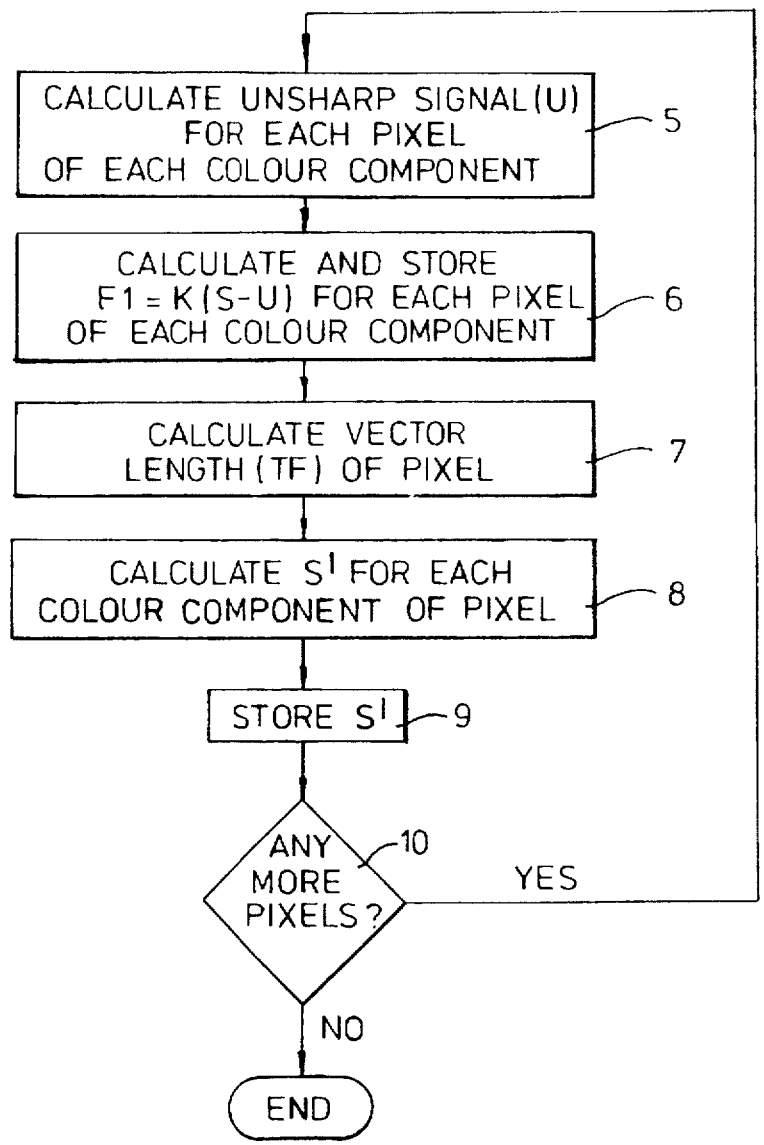
FIG. 2 is a flow diagram illustrating operation of the apparatus.

FIG. 2 is a flow diagram illustrating operation of the processor 1. Initially, in a step 5, the processor 1 obtains for each colour component of each pixel an unsharp signal U. Effectively this is obtained by deriving a low pass filtered version of the image although in practice a complete low pass filtered version would not be generated at step 5 and the following step 6 will be carried out sequentially for each pixel. For example, step 5 could be carried out using the technique described in U.S. Pat. No. 4,724,489. Once the unsharp signal U for a particular colour component of a pixel has been determined, the processor 1 then calculates and stores a fringe signal F1 for that colour component of that pixel. This fringe signal is determined in accordance with the equation:

$$F = 1K(S-U)$$

where

S is the original colour component value stored in the image store 2 for that pixel and K is a colour gain factor for that particular colour component. Typically, there will be a different colour gain factor K for each colour component. The fringe values are determined for each colour component of the pixel in accordance with the formula set forth above and are stored in the fringe store 3 so that for each pixel there will be three or four such fringe values e.g. F1, F2, F3, F4. (Step 6). Having stored the fringe values in the fringe store 3, the processor 1 then operates on each pixel in sequence to carry out steps 7–10. Thus, the processor 1 extracts the three or four fringe values for the first pixel stored in the fringe store 3 and calculates the length of a vector of which these fringe values form the components. This vector length TF is defined as the sum of the squares of the fringe values F1. (Step 7). FIG. 3 depicts a vector for a pixel with three fringe values where the fringe values, F1, F2, F3, can be considered in terms of coordinates within a three-dimensional space defined by orthogonal axes corresponding to the three colour components.

In a step 8, the processor 1 then determines for each colour component of the pixel concerned the appropriate final corrected value S' in accordance with one of the formulae:

$$S'=F1\times[(1-TH/TF)\times SH1^2+(TH/TF)\times SM1^2]^{1/2}+O$$

if the value of TF exceeds the threshold TH, and $S'=(F1\times SM1)+O$ if the value of TF is equal to or below the threshold TH, where:

O is the original image pixel value or a value derived from the image pixel value for that colour component, F1 is the fringe value for that pixel and colour component after multiplication by the factor specified by the colour gain for that colour component, TF is the square of the total length of the fringe vector, SH1 is the gain specified by a sharpening parameter, SM1 is the gain specified by a smoothing parameter, and TH is the threshold.

The values S' are then stored in the image store 2 (step 9) and in a step 10 the processor determines whether any more pixels have to be processed. If they do processing returns to step 7.

The operator can determine the threshold, sharpening and smoothing values and the colour gain factors K by inputting appropriate values by the input device 4.

The equation given above ensures continuity at the threshold.

I claim:

1. A method of enhancing a multi-coloured image, defined by a plurality of colour components represented by electrical signals respectively representing the value of each colour component of each pixel of a first resolution version of the image, to produce an enhanced image, the method comprising, for said each colour component of each pixel, obtaining a fringe value by determining the difference between the component values at the first resolution and at a second, lower resolution; determining for each pixel the length of a vector whose components are defined by values related to the fringe values of that pixel; and modifying one of each original colour component value and a value derived from each original colour component value by an amount related to the respective fringe value in accordance with the relationship of said vector length with a threshold to produce said enhanced image.

2. A method according to claim 1, wherein said components of said vector comprise the fringe values after multiplication by respective weights.

3. A method according to claim 1, wherein the length of said vector is compared with said threshold and if said length is less than or below said threshold then one process is applied when modifying said one of said original colour component value and a value derived from the original colour component value, while if said length of said vector exceeds said threshold another process is applied when modifying said one of said original colour component image pixel value and a value derived from the original colour component value.

4. A method according to claim 1, wherein said modifying step comprises determining the resultant pixel value S' for a particular colour component in accordance with the following algorithm:

$$S' = F1 \times |(1 - TH/TF) \times SH1^2 + (TH/TF) \times SM1^2|_{1/2} + O$$

where:

O is the original image pixel value or a value derived from the image pixel value for that colour component, F1 is the fringe value for that pixel and colour component after multiplication by the factor specified by the colour gain for that colour component, TF is the square of the total length of the fringe vector, SH1 is the gain specified by a sharpening parameter, SM1 is the gain specified by a smoothing parameter, and TH is the threshold.

5. Apparatus for enhancing a multi-coloured image, defined by a plurality of colour components represented by electrical signals respectively representing the value of each colour component of each pixel of a first resolution version of the image, to produce an enhanced image, the apparatus comprising a first store for storing the first resolution version of the image; a second store for storing fringe values; and processing means coupled with the first and second stores, the processing means being adapted to determine, for said each colour component of each pixel in the first store, a fringe value by determining the difference between the component values at the first resolution and at a second, lower resolution and storing the fringe values in the second store; to determine for each pixel the length of a vector whose components are defined by values related to the fringe values of that pixel; and to modify one of each original colour component value and a value derived from each original colour component value in the first store by an amount related to the respective fringe value determined in accordance with the relationship of the vector length with a threshold to produce said enhanced image.

6. A method according to claim 1, wherein said modified original colour component values are stored.

\* \* \* \* \*